United States Patent
Muraoka et al.

(10) Patent No.: US 10,229,520 B2
(45) Date of Patent: Mar. 12, 2019

(54) FEATURE-VALUE DISPLAY SYSTEM, FEATURE-VALUE DISPLAY METHOD, AND FEATURE-VALUE DISPLAY PROGRAM

(71) Applicant: NEC Corporation, Tokyo (JP)

(72) Inventors: Yusuke Muraoka, Tokyo (JP); Ryohei Fujimaki, Tokyo (JP)

(73) Assignee: NEC Corporation, Tokyo (JP)

( * ) Notice: Subject to any disclaimer, the term of this patent is extended or adjusted under 35 U.S.C. 154(b) by 75 days.

(21) Appl. No.: 15/323,290

(22) PCT Filed: Jun. 3, 2015

(86) PCT No.: PCT/JP2015/002807
§ 371 (c)(1),
(2) Date: Dec. 30, 2016

(87) PCT Pub. No.: WO2016/002132
PCT Pub. Date: Jan. 7, 2016

(65) Prior Publication Data
US 2017/0148196 A1    May 25, 2017

Related U.S. Application Data

(60) Provisional application No. 62/018,891, filed on Jun. 30, 2014.

(51) Int. Cl.
*G06T 11/20* (2006.01)
*G06F 13/00* (2006.01)
(Continued)

(52) U.S. Cl.
CPC ............ *G06T 11/206* (2013.01); *G06F 13/00* (2013.01); *G06F 17/30958* (2013.01); *G06N 5/04* (2013.01); *G06Q 30/0269* (2013.01)

(58) Field of Classification Search
CPC ......................... G06F 17/30958; G06T 11/206
See application file for complete search history.

(56) References Cited

U.S. PATENT DOCUMENTS 7,870,604 B1 *   1/2011   Guichard ............ H04L 63/0272
                                                                   726/15
8,203,990 B2 *   6/2012   Watanabe ............... H04L 45/32
                                                                   370/315
(Continued)

FOREIGN PATENT DOCUMENTS

| JP | 2005-234797 | 9/2005 |
| JP | 2009-282574 | 12/2009 |

(Continued)

OTHER PUBLICATIONS

International Search Report and Written Opinion of ISA dated Jul. 28, 2015 in corresponding PCT International Application.

*Primary Examiner* — Ryan R Yang
(74) *Attorney, Agent, or Firm* — Finnegan, Henderson, Farabow, Garrett & Dunner, L.L.P.

(57) ABSTRACT

Provided is a feature-value display system which can display a feature value of a node for accurate prediction of a state of the node in a graph structure or a network structure. The feature-value display system 1 displays the feature value of the current node, considering information generated on the basis of attribute information associated with the nodes adjacent to or closer to a current node in the graph structure or the network structure, as the feature value of the current node itself.

9 Claims, 10 Drawing Sheets

(51) Int. Cl.
*G06F 17/30* (2006.01)
*G06N 5/04* (2006.01)
*G06Q 30/02* (2012.01)

(56) References Cited

U.S. PATENT DOCUMENTS

| | | |
|---|---|---|
| 2009/0284531 A1 | 11/2009 | Ishioka |
| 2010/0257157 A1 | 10/2010 | Tomita |
| 2013/0135314 A1* | 5/2013 | Haggerty ............. G06Q 10/107 345/440 |
| 2014/0046983 A1* | 2/2014 | Galloway ......... G06F 17/30958 707/798 |
| 2015/0026103 A1* | 1/2015 | Goldschmidt ....... G06N 99/005 706/12 |
| 2015/0120717 A1* | 4/2015 | Kim .................. G06F 17/30699 707/727 |
| 2017/0140116 A1* | 5/2017 | Seward ................ G06F 19/345 |
| 2017/0161625 A1* | 6/2017 | Jannson ................... G06N 7/00 |

FOREIGN PATENT DOCUMENTS

| | | |
|---|---|---|
| JP | 2014-2683 | 1/2014 |
| WO | WO 2009/022713 A1 | 2/2009 |

* cited by examiner

FIG. 5

USER ID: 12345

PERCENTAGE OF COMMUNICATION PARTIES
BELONGING TO DOMESTIC SALES DEPARTMENT:  40%

PERCENTAGE OF COMMUNICATION PARTIES
BELONGING TO OVERSEAS BUSINESS DEPARTMENT:  3%

⋮  ⋮

FEATURE-VALUE DISPLAY SYSTEM, FEATURE-VALUE DISPLAY METHOD, AND FEATURE-VALUE DISPLAY PROGRAM

CROSS-REFERENCE TO RELATED PATENT APPLICATIONS

This application is a National Stage Entry of International Application No. PCT/JP2015/002807, filed Jun. 3, 2015, which claims priority from U.S. Provisional Application No. 62/018,891, filed Jun. 30, 2014. The entire contents of the above-referenced applications are expressly incorporated herein by reference.

TECHNICAL FIELD

The present invention relates to a feature-value display system, a feature-value display method, and a feature-value display program which display a feature value of a node in a graph structure or a network structure, and further relates to a visualization system.

BACKGROUND ART

In PTL 1, a content distribution device is described, and the content distribution device distributes content such as advertisement through a network such as the Internet. The content distribution device described in PTL 1 extracts information about users who have performed a target action for campaign from log data, and calculates feature values of the users. Then, on the basis of scores of the users calculated on the basis of the feature values, a user likely to perform the target action for the campaign is extracted.

CITATION LIST

Patent Literature

PTL 1: Japanese Patent Application Laid-Open No. 2014-2683

SUMMARY OF INVENTION

Technical Problem

For example, users performing chat on office communication terminals with an office chat system can be said to be nodes constituting a graph structure or a network structure. Communication performed between users of the communication terminals is considered to have an edge between the users (nodes).

States (e.g., business situation) of the users of the communication terminals corresponding to such nodes are preferably predicted accurately.

An administrator of the office chat system can obtain information about a department or the like of each of the users performing chat on the office communication terminals. However, it is hard to predict a specific state of the user on the basis of such information. For example, even if the department of the user of the communication terminal is identified, it is difficult to specifically predict the business situation or the like of the user.

In the above example, the user performing chat using the office communication terminals have been exemplified as the node, but the node is not limited to such a user, and a state of a node of the graph structure or the network structure is preferably predicted accurately.

Therefore, an object of the present invention is to provide a feature-value display system, a feature-value display method, and a feature-value display program which display a feature value of a node for accurate prediction of a state of the node in a graph structure or a network structure, and further provide a visualization system.

Solution to Problem

The feature-value display system according to the present invention is a feature-value display system displaying a feature value of a current node of a plurality of nodes constituting a graph structure or a network structure, and the feature-value display system displays the feature value of the current node, considering information generated on the basis of attribute information associated with nodes adjacent to or closer to the current node, as the feature value of the current node itself.

Furthermore, the visualization system according to the present invention is a visualization system visualizing a characteristic of a current node of a plurality of nodes in association with each other, and the visualization system includes means for identifying a related nodes relating to the current node on the basis of association between the nodes, and means for outputting a graph representing the characteristic of the current node on the basis of attribute information about the related nodes.

Furthermore, the feature-value display method according to the present invention is a feature-value display method for, implemented by a computer, displaying a feature value of a current node of a plurality of nodes constituting a graph structure or a network structure, and in the feature-value display method, the feature value of the current node is displayed, considering information generated on the basis of attribute information associated with nodes adjacent to or closer to the current node in the graph structure or the network structure, as the feature value of the current node itself.

Furthermore, a feature-value display program according to the present invention causes a computer displaying a feature value of a current node of a plurality of nodes constituting the graph structure or the network structure to execute a process, including displaying the feature value of the current node, considering information generated on the basis of attribute information associated with nodes adjacent to or closer to the current node in the graph structure or the network structure, as the feature value of the current node itself.

Advantageous Effects of Invention

According to the present invention, the feature value of the node can be displayed so that a state of the node of the graph structure or the network structure can be accurately predicted.

BRIEF DESCRIPTION OF DRAWINGS

FIG. 5 It depicts a schematic view illustrating a display example in step S6.

DESCRIPTION OF EMBODIMENTS

An exemplary embodiment of the present invention will be described below with reference to the drawings.

In the following description, a node in a graph structure or a network structure represents a person performing chat on an office communication terminal with an office chat system, or represents the office communication terminal. Hereinafter, the office communication terminal is simply referred to as communication terminal.

Note that, any of the graph structure and the network structure is data in which the nodes are connected by edges. Accordingly, "node in the graph structure or the network structure" can be simply referred to as "node in the graph structure" or "node in the network structure".

Figure 1:
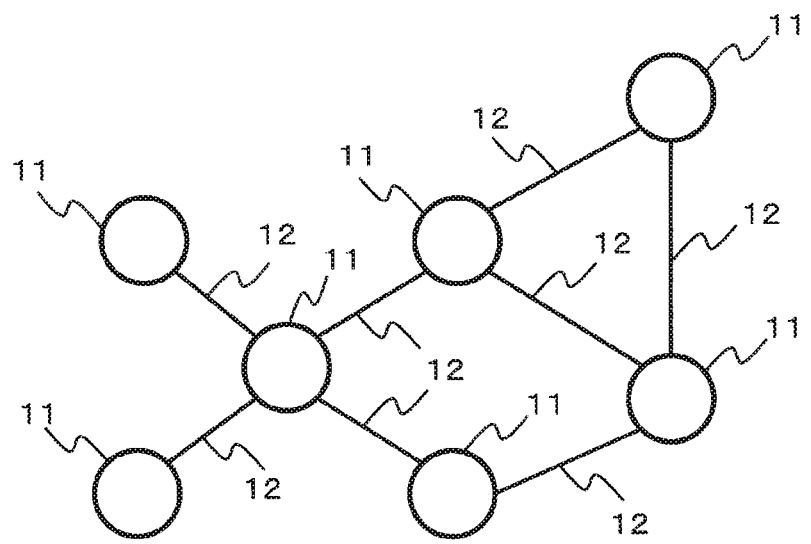
FIG. 1 It depicts a schematic view illustrating an example of a graph structure or a network structure.

FIG. 1 is a schematic view illustrating an example of the graph structure or the network structure. Each of the nodes 11 corresponds to the communication terminal or a user of the communication terminal. Each of the edges 12 corresponds to previous communication between the nodes connected by the edge 12 through the communication terminals. For example, when a user corresponding to a node 11 and a user corresponding to another node previously communicated with each other, the two nodes 11 are connected by an edge 12. The edge 12 may be associated with information about communication frequency or the number of communications between the nodes connected by the edge 12.

Figure 2:
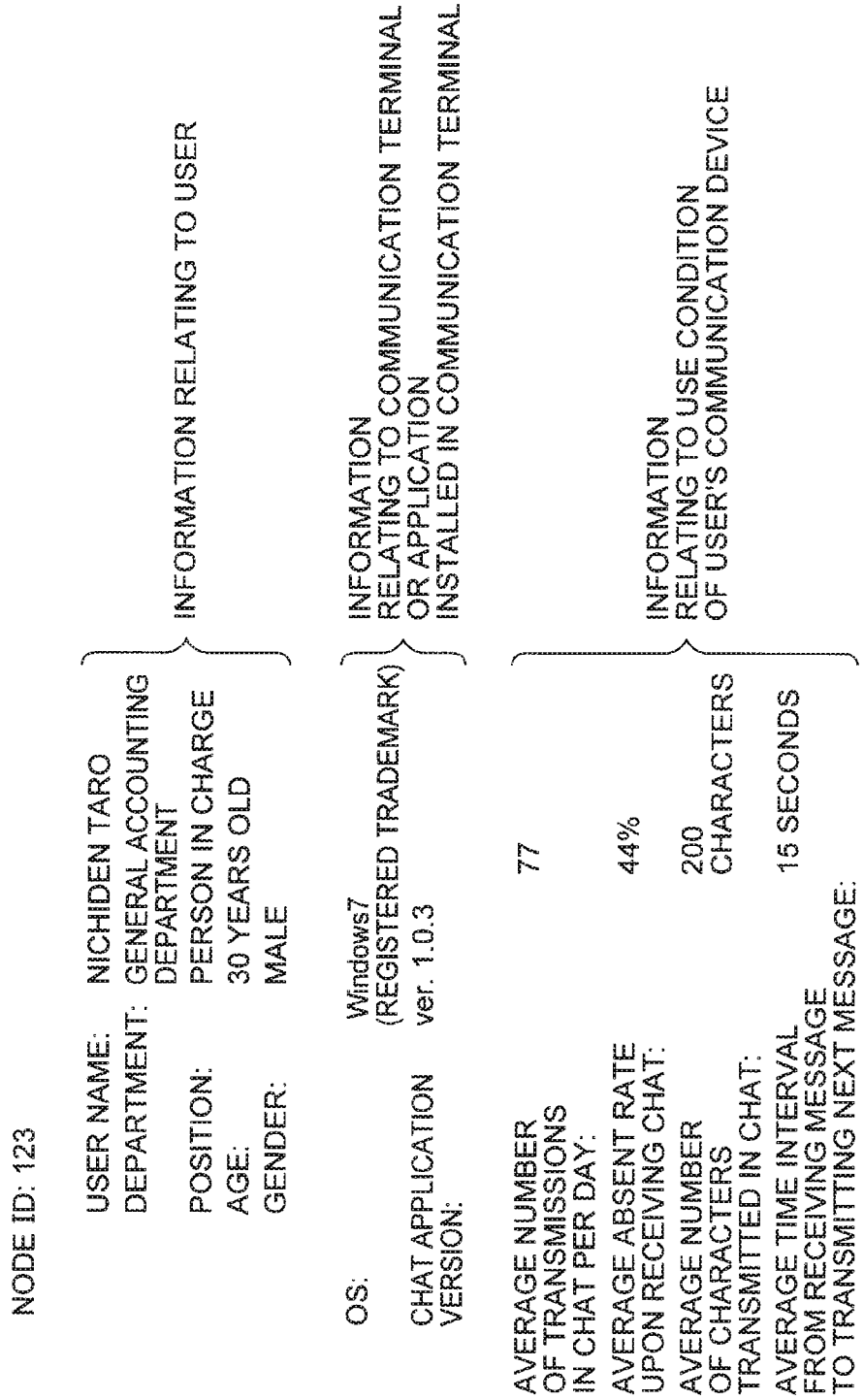
FIG. 2 It depicts a schematic view illustrating an example of attribute information associated with a node.

Furthermore, each of the nodes 11 is associated with attribute information including information relating to a communication terminal or a user thereof corresponding to the node 11, or information representing a use condition of the communication terminal of the user corresponding to the node. FIG. 2 is a schematic view illustrating an example of attribute information associated with a node. "Node ID" illustrated in FIG. 2 is identification information about the node. When the node corresponds to a user, identification information about the user is preferably employed as the node ID. Furthermore, when the node corresponds to a communication terminal, identification information about the communication terminal is preferably employed as the node ID. When the node corresponds to the user, the attribute information includes, for example, the name, department, position, age, and gender of the user. When the node corresponds to the communication terminal, the attribute information includes, for example, the name of an OS and a version of a chat application installed in the communication terminal. Furthermore, the node 11 may be associated, as the attribute information, with information representing the use condition of the communication terminal of the user, such as "average number of transmissions in chat per day", "average absent rate upon receiving chat", "average number of characters transmitted in chat", and "average time interval from receiving message to sending next message". Furthermore, the node 11 may be associated, as the attribute information, with information chronologically representing detailed communication conditions, such as how many characters are transmitted at what time in chat, in addition to values representing average values as described above. Furthermore, the node 11 may be associated, as the attribute information, with information corresponding to the graph structure or the network structure illustrated in FIG. 1. For example, the node 11 may be associated, as the attribute information, with identification information (communication record) of a node as a party with which communication is previously performed. Furthermore, the node 11 may be associated, as the attribute information, with information about communication frequency or the number of communications with the party with which communication is performed. The communication record may be included in the attribute information, or may be managed as information different from the attribute information.

The attribute information illustrated in FIG. 2 is by way of example, and the attribute information is not limited to the illustration in FIG. 2.

Figure 3:
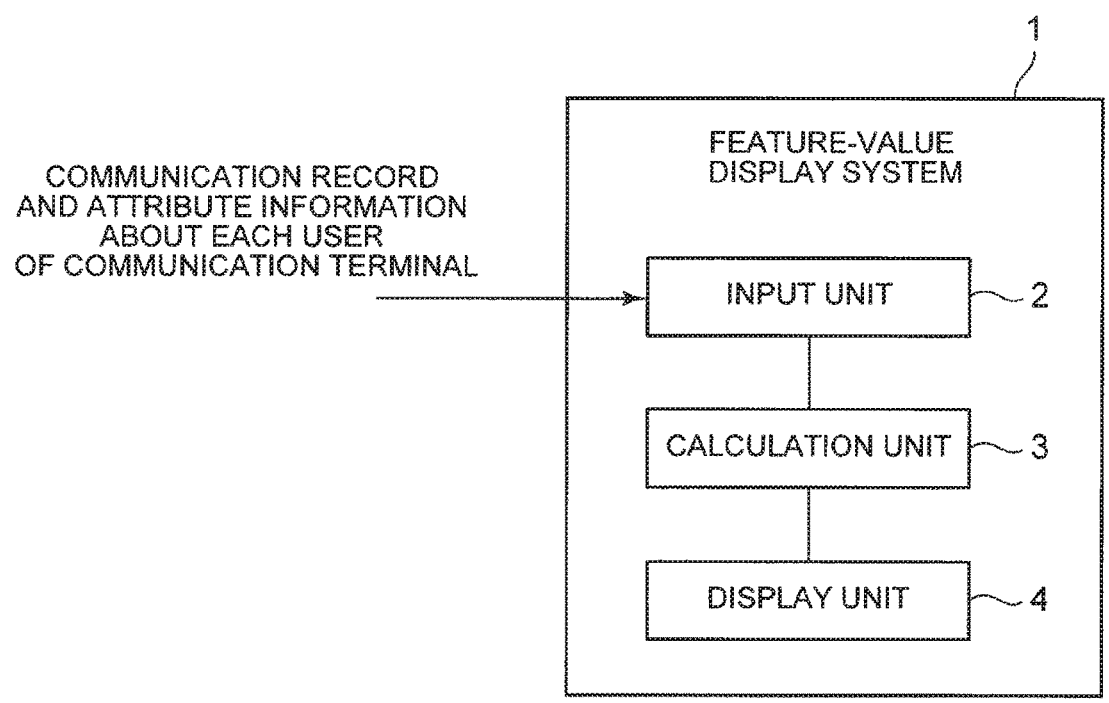
FIG. 3 It depicts a block diagram illustrating an exemplary configuration of a feature-value display system according to the present invention.

FIG. 3 is a block diagram illustrating an exemplary configuration of a feature-value display system according to the present invention. The feature-value display system 1 according to the present invention includes an input unit 2, a calculation unit 3, and a display unit 4.

The input unit 2 is an input interface in which the communication record of a user of each communication terminal, and the attribute information about each user are input. The attribute information about the user includes, for example, the department, age, gender, and the like of the user, but is not limited only to these information items. The communication record is information representing communication between who and who (chat as an example of the present exemplary embodiment). Accordingly, the graph structure or the network structure in which the user of each communication terminal is defined as the node can be derived from the communication record.

An administrator of the office chat system (not illustrated) holds the communication record and attribute information about each user.

In the present exemplary embodiment, use of the feature-value display system 1 by the administrator of the office chat system will be described, as an example. The administrator of the office chat system inputs the held communication record and attribute information about each user to the input unit 2.

The display unit 4 is a display device.

The calculation unit 3 derives the graph structure or the network structure in which each user of the communication terminal is defined as the node, on the basis of the communication record input to the input unit 2. The calculation unit 3 preferably defines the user of the communication terminal as the node, refers to the communication record to identify a pair of nodes (users of the communication terminals) communicating (chatting) with each other, and connect the pair of nodes by the edge in order to derive the graph structure or the network structure. Furthermore, the calculation unit 3 associates each node of the graph structure or the network structure with the attribute information about a user corresponding to the node. When the graph structure or the network structure is derived with the communication terminal as the node, the calculation unit 3 associates each node with the attribute information about the communication terminal corresponding to the node. Furthermore, the calculation unit 3 may associate each node with a use condition of a user's communication device corresponding to the node, as the attribute information.

Then, the calculation unit 3 displays a feature value of the node on the display unit 4. Here, the calculation unit 3 causes the display unit 4 to display the feature value of the current node, considering attribute information about adjacent nodes adjacent to the current node as the feature value of the current node. In the following description, displaying information on the display unit 4 by the calculation unit 3 is simply described as "the calculation unit 3 displays the information". Note that, an adjacent node adjacent to the current node is a node having a hop count of one from the current node.

The calculation unit 3 is achieved by for example a CPU of a computer operated according to a feature-value display program. In this configuration, for example, the CPU preferably reads the feature-value display program from a program recording medium such as a program recording device (not illustrated in FIG. 3) of the computer to be operated as the calculation unit 3 according to the program. Furthermore, the feature-value display system 1 may include two or more of physically separated devices connected to each other in a wired or wireless manner.

Figure 4:
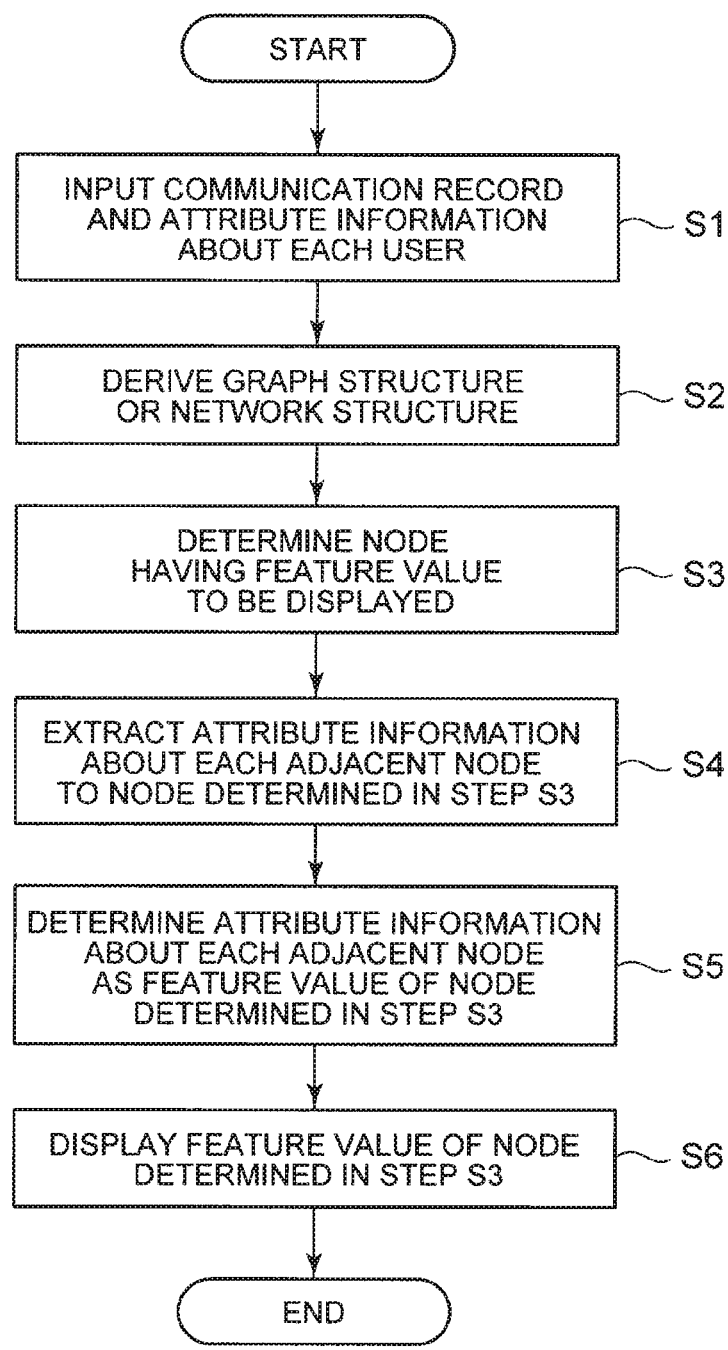
FIG. 4 It depicts a flowchart illustrating an example of progress of processing of the present invention.

Next, description will be made of operation. FIG. 4 is a flowchart illustrating an example of progress of processing of the present invention.

First, the communication record of the user of each communication terminal, and the attribute information about each user are input to the input unit 2 (step S1).

Next, the calculation unit 3 derives the graph structure or the network structure in which each user of the communication terminal is defined as the node, on the basis of the communication record input to the input unit 2 (step S2). As described above, the calculation unit 3 preferably defines the user of each communication terminal as the node, refers to the communication record to identify a pair of nodes communicating with each other, and connect the pair of nodes by the edge in order to derive the graph structure or the network structure. Furthermore, the calculation unit 3 associates each node with the attribute information about the user corresponding to the node.

Next, the calculation unit 3 determines a node having a feature value to be displayed (step S3). The method of determining a node having a feature value to be displayed is not particularly limited. For example, when a node having a feature value to be displayed is designated by an administrator using the feature-value display system 1, the calculation unit 3 may determine the node as the node having a feature value to be displayed. The method described here is merely an example, and the node having a feature value to be displayed may be determined by another method.

Next, the calculation unit 3 extracts attribute information about each adjacent node to the node determined in step S3 (attribute information associated with each adjacent node) (step S4). In the present exemplary embodiment, processing of step S4 is processing of extracting attribute information about users of the communication terminals, previously performing office chat with the user corresponding to the node determined in step S3.

Next, the calculation unit 3 determines the attribute information about each adjacent node extracted in step S4 as the feature value of a node determined in step S3 (step S5), and displays the feature value of the node determined in step S3 (step S6). Specifically, the calculation unit 3 determines the feature value of the node determined in step S3, on the basis of the attribute information about the adjacent nodes extracted in step S4, and displays the feature value.

For example, suppose that the calculation unit 3 extracts the department of each user corresponding to each of the adjacent nodes, as the attribute information about each adjacent node to the node determined in step S3. In this case, the calculation unit 3 may determine percentages of users corresponding to the adjacent nodes, belonging to various departments, as the feature value of the user corresponding to the node determined in step S3, and display the feature value. This means that percentages of communication parties of the current user, belonging to various departments are displayed as the feature value of the current user (user corresponding to the node determined in step S3).

The calculation unit 3 may determine a plurality of kinds of feature values. For example, the calculation unit 3 may determine and display a feature value relating to the department, and a feature value relating to another attribute (e.g., age). An example of a feature value relating to age includes, for example, a statistic value of age (average value or the like). When the feature value relating to age is determined, the calculation unit 3 preferably extracts age information in step S4, as the attribute information about the adjacent nodes. Here, determination of the feature value from the department and age by the calculation unit 3 has been described as an example, but the calculation unit 3 may determine the feature value of the current user from the attribute information other than the department or age.

Furthermore, to the input unit 2, information representing the communication frequency between one node (user) and another node (user) may be input. In this configuration, the calculation unit 3 may associate the edge connecting the nodes with information representing the communication frequency. Then, the calculation unit 3 also may take the communication frequency associated with the edge between the node and the adjacent node into consideration to determine the feature value of the current node.

FIG. 5 is a schematic view illustrating a display example in step S6. "User ID" illustrated in FIG. 5 is identification information about the current user (user corresponding to the node determined in step S3). FIG. 5 illustrates an example of the calculation unit 3 determining the percentages of communication parties of the current user, belonging to various departments of all communication parties, and displaying the percentages. FIG. 5 illustrates the percentages of a plurality of departments, but the calculation unit 3 may determine only percentage of the communication parties belonging to a specific department, and display only percentage of the communication parties belonging to the specific department.

A state of a user may be more accurately predicted when the feature values obtained from the attribute information about communication parties of the user are referred to, rather than the attribute information about the user. For example, even if the department of a user of the communication terminal can be identified, it is difficult to predict a specific situation (e.g., business situation) of the user. In contrast, when the percentages of the departments of the communication parties are found from the attribute information about the communication parties of the current user, the state of the current user can be specifically predicted. For example, when a display result as illustrated in FIG. 5 is obtained, it is specifically predicted that a user corresponding to the user ID "12345" is "engaged in business with a domestic sales department, and not engaged in much overseas business", because communication parties belonging to the domestic sales department has a high percentage, and communication parties belonging to the overseas business department has a very low percentage, and prediction accuracy is also increased.

In the present exemplary embodiment, the feature-value display system 1 determines the feature value of the node determined in step S3, from the attribute information about the adjacent nodes to the node determined in step S3, and displays the feature value of the node. Accordingly, the administrator using the feature-value display system 1 can accurately predict a specific state of the node determined in step S3.

Furthermore, in the above example, displaying the feature value of the user of the communication terminal at a certain point in time has been described as an example. The feature-value display system 1 may for example periodically determine the feature value, and display the change in feature value of the node (user of the communication terminal) over time.

An example of monthly variation of the feature value will be described below, where the "periodically" means monthly, but the determination may not be performed monthly. For example, in step S1, communication record of the user of each communication terminal, and the attribute information about each user are input each month. Then, the calculation unit 3 preferably performs steps S1 to S5 described above, for each communication record and attribute information corresponding to each month. However, the node (node having a feature value to be displayed) determined in step S3 is fixed over months. Then, in step S6, the calculation unit 3 displays the feature value of each month of the current user.

At that time, the calculation unit 3 preferably displays the feature value in chronological order to display the change in feature value of the user over time. Furthermore, when the feature value is displayed in the chronological order, the calculation unit 3 may display the feature value in words, but preferably displays the feature value in a graph. That is, the calculation unit 3 preferably displays the change in feature value of the user over time in a graph.

Figure 6:
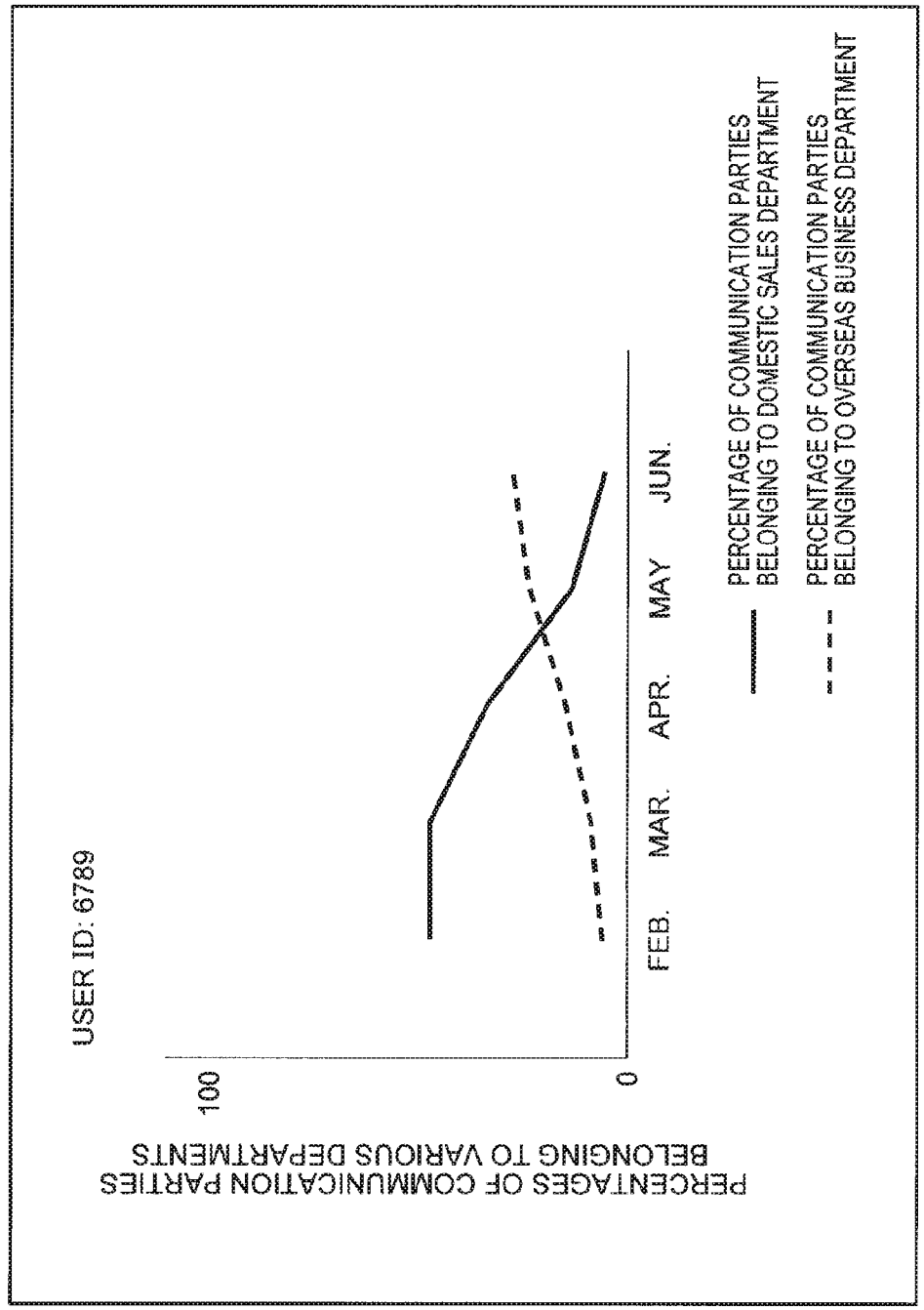
FIG. 6 It depicts a schematic view illustrating an example of displaying change in feature value over time in a graph.

FIG. 6 is a schematic view illustrating an example of displaying change in feature value over time in a graph. "User ID" illustrated in FIG. 6 is identification information about the current user (user corresponding to the node determined in step S3). In the graph illustrated in FIG. 6, a horizontal axis represents a time axis. In the graph illustrated in FIG. 6, a vertical axis represents the percentages of communication parties of the current user belonging to various departments. Furthermore, a solid line represents change in percentage of the communication parties belonging to the domestic sales department, and a broken line represents the change in percentage of the communication parties belonging to the overseas business department.

In an example illustrated in FIG. 6, the percentage of the communication parties of a user corresponding to a user ID "6789", belonging to the domestic sales department of all communication parties is gradually reduced after April. Furthermore, the percentage of communication parties belonging to the overseas business department is gradually increased after April. Accordingly, the business of the user corresponding to the user ID "6789" can be predicted to be gradually shifted from the domestic business to the overseas business, after April.

As described above, displaying the change in feature value of the user over time allows more specific and accurate prediction of the state of the current node (user of the communication terminal). Furthermore, as illustrated in FIG. 6, displaying the change in feature value of the user over time in a graph allows an intuitive understanding of the change in feature value, and prediction is facilitated as described above.

Note that, when displaying not the change in feature value over time but the feature value at a certain point in time, the calculation unit 3 may display the feature value in a graph (e.g., circular graph).

Effects of the present exemplary embodiment will be described with specific examples.

Figure 7:
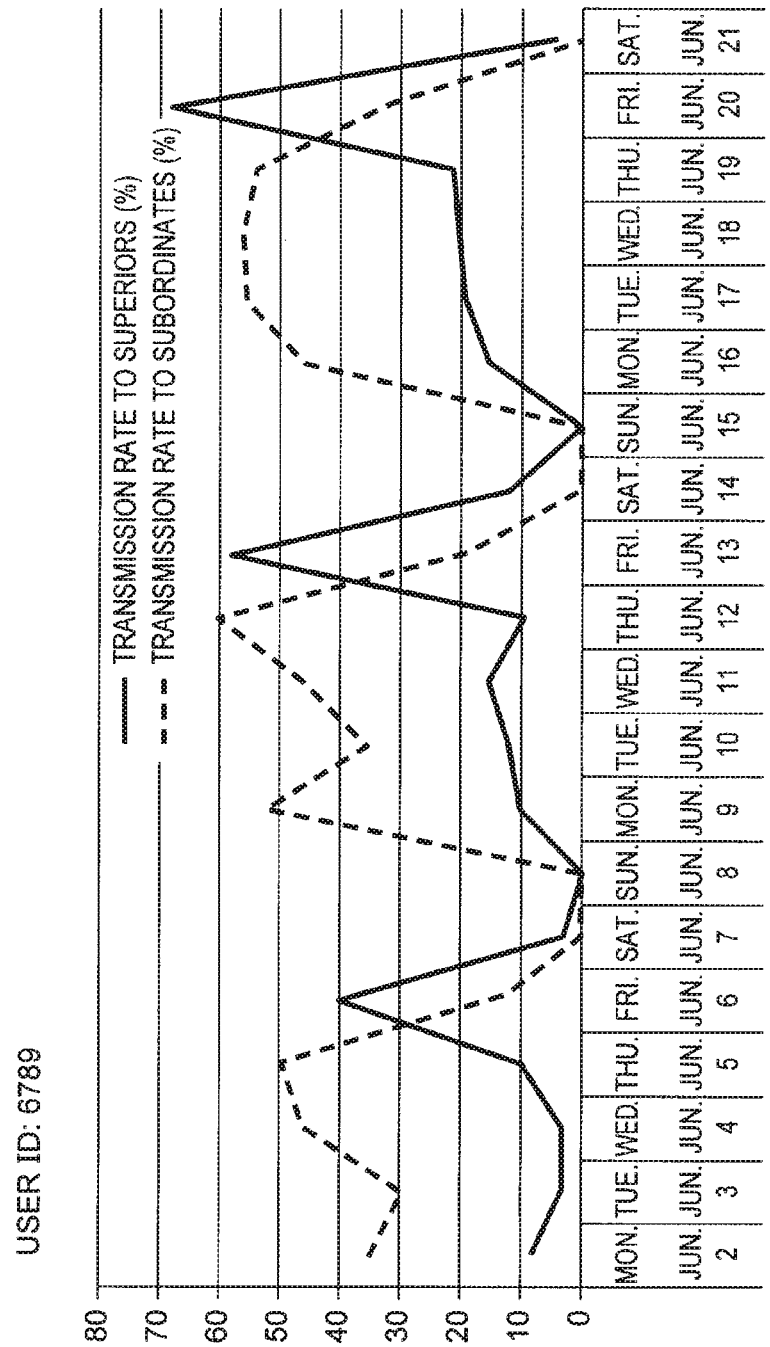
FIG. 7 It depicts a schematic view illustrating an example of displaying change in feature value over time in a graph.

FIG. 7 is a schematic view illustrating an example of displaying change in feature value over time in a graph. "User ID" illustrated in FIG. 7 is identification information about the current user (user corresponding to the node determined in step S3). In the graph illustrated in FIG. 7, a horizontal axis represents a time axis. In the graph illustrated in FIG. 7, a vertical axis represents the percentage of positions of the parties, as transmission destinations, of the current user. Furthermore, a broken line represents the change in percentage of parties as transmission destinations, having a lower position than the current user (e.g., subordinates). A solid line represents the change in percentage of parties as transmission destinations, having a higher position than the current user (e.g., superiors). The lower and higher positions are previously defined.

In an example illustrated in FIG. 7, the change in percentage of parties having a lower position than the current user, and the change in percentage of parties having a higher position than the current user shows that parties as transmission destinations of a user corresponding to a user ID "6798" periodically change depending on a day of the week. That is, the parties having a lower position has a high percentage of the transmission destination of the user corresponding to the user ID "6798", from Monday to Thursday, and on Friday, the parties having a higher position has a high percentage. Therefore, for example, the user corresponding to the user ID "6798" can be predicted to actively exchange information with the subordinates from Monday to Thursday, and reports to the information about events of the week, on Friday. Furthermore, information illustrated in FIG. 7 shows the administrator that an element "a day of the week" is important to predict the state of the user corresponding to the user ID "6798". For example, in predicting the state of the user corresponding to the user ID "6798", use of the element "a day of the week" as an explanatory variable can be conceived of.

Effects of the present exemplary embodiment will be further described with other examples.

For example, suppose that the administrator of the office chat system desires to predict how frequently the user corresponding to the user ID "6798" uses the office chat system in the future.

Figure 8:
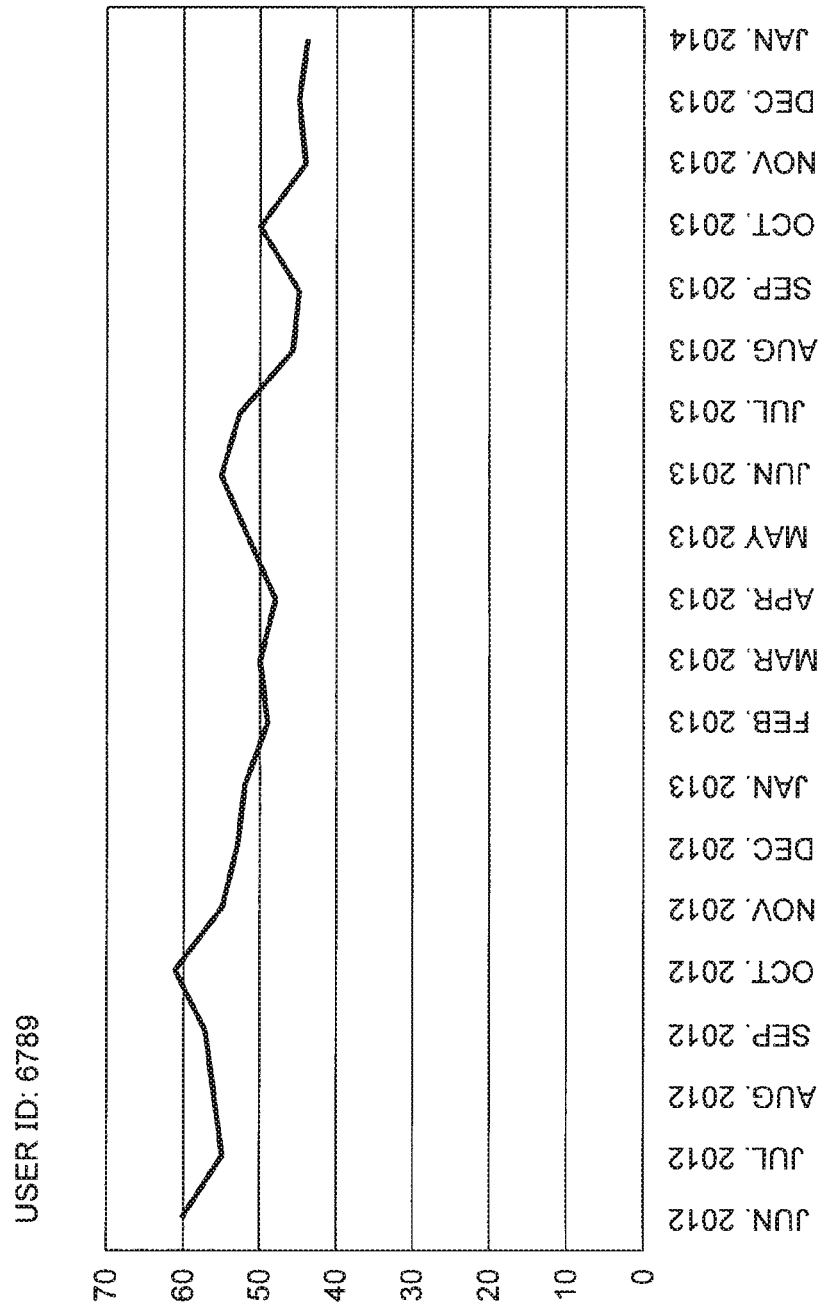
FIG. 8 It depicts a graph illustrating the number of transmissions per day in chronological order, using an office chat system by a current user.

FIG. 8 is a graph illustrating the number of transmissions per day in chronological order, using the office chat system by the user corresponding to the current node (user ID "6789"). FIG. 8 shows that the number of transmissions in chat of the user corresponding to the user ID "6798" is slightly reduced.

Figure 9:
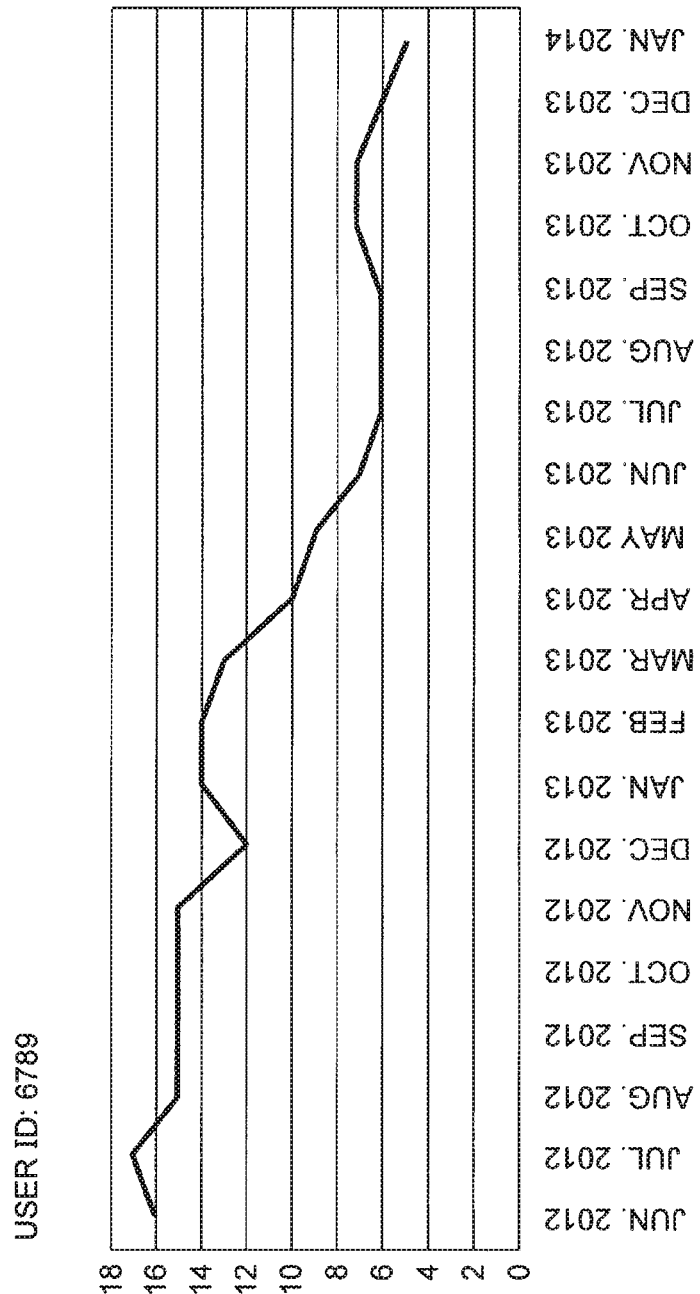
FIG. 9 It depicts a graph illustrating an example of an average number of transmissions in chat per day of top three of parties as transmission destinations of the current user, and the top three parties frequently communicate with the current user.

FIG. 9 is a graph illustrating an example of an average number of transmissions in chat per day of top three of parties as transmission destinations of the current user (user ID "6789"), and the top three parties frequently communicate with the current user. As can be seen from FIG. 9, the number of transmissions in chat of the top three parties as transmission destinations of the current user is considerably reduced.

In looking at only information (information about the current user him-/her-self) illustrated in FIG. 8, the current user is considered to be likely to continuously use the office chat system in the future. However, by referring to information illustrated in FIG. 9 (information about parties corresponding to the adjacent nodes to the current user) in addition to the information illustrated in FIG. 8, the administrator of the office chat system can recognize that the current user is highly likely to cease to use the office chat system in the near future. It is because infrequent use of the office chat system by the communication parties highly frequently communicating with the current user leads to infrequent use of the office chat system by the current user in the future.

As described above, when prediction of a future trend of a node is desired, not only attribute information about a node to be predicted, but also attribute information about other nodes (adjacent nodes) previously communicating with the node to be predicted may be referred to for further accurate understanding of trend or prediction of a state in the future of the node to be predicted.

In the above description, the node in the graph structure or the network structure being the party performing chat in the office using the office communication terminal, or the communication terminal has been described as an example. The present invention can be applied, even if the node in the graph structure or the network structure is not such a party or communication terminal.

For example, the node in the graph structure or the network structure may be each user of a cellular phone having a contract with a mobile carrier. Then, the calculation unit 3 may connect two users communicating with an edge, on the basis of the communication record. The calculation unit 3 may connect a sender and a receiver with the edge. Alternatively, the calculation unit 3 may connect the two users with the edge, on condition that one of the two users is defined as a sender and the other is defined as a receiver and then the receiver turns to a sender and the sender turns to a receiver to perform communication again. The mobile carrier holds attribute information and a communication record of each cellular phone user. The mobile carrier may use the feature-value display system 1, and a company other than the mobile carrier may use the feature-value display system 1.

However, when each cellular phone user is defined as the node, it is preferable that each user gives consent to prediction of the condition of the user or disclosure of a result of the prediction. Furthermore, a company allowed to use the feature-value display system 1 according to the present invention, or a company permitted to obtain disclosure of the result of the prediction is preferably limited to a company trusted by the users. Note that, when the mobile carrier uses the feature-value display system 1, the communication record and the attribute information about each cellular phone user, which are held by the mobile carrier, are preferably input to the input unit 2. When the company other than the mobile carrier uses the feature-value display system 1, the company preferably obtains the communication record and the attribute information about each cellular phone user from the mobile carrier, and then puts the communication record and the attribute information to the input unit 2.

Furthermore, the company predicting the states of the cellular phone users from display on the feature-value display system 1 may determine to take action such as distribution of advertisements or coupon information to the current users, according to a result of the prediction. Furthermore, on condition that each user gives consent to disclosure of the result of the prediction about the user him-/her-self, the result of the prediction can be disclosed to a distributor distributing advertisements, coupon information, or the like. The distribution of the advertisements or coupon information according to the result of the prediction allows the cellular phone users to obtain appropriate advertisement or coupon information. Furthermore, the feature-value display system 1 may determine action according to the result of the prediction. In this configuration, the calculation unit 3 preferably determines action to the user, according to the feature value of the current user determined in step S5. The calculation unit 3 preferably determines action according to a predetermined rule. In the rule, conditions of the feature value and action are preferably defined.

Furthermore, the attribute information may employ for example information representing a model name of a cellular phone or an installed OS, in addition to the age and gender of the cellular phone user. Furthermore, other attribute information may employ information representing a degree of actively use of the coupon information or the like by the cellular phone user in the past.

For example, suppose that the information representing how actively the coupon information was used in the past cannot be obtained for a user. In such a situation, for example, almost of parties communicating with the user are found to actively use the coupon information. Alternatively, parties having a high frequency in communication with the user are found to actively use the coupon information. Based on the assumption that users having similar preference frequently communicate with each other, the current user in the present example can be predicted to actively use the coupon information.

Furthermore, other attribute information may employ information for example representing that the user actively browses what type of advertisement information.

Furthermore, in the present invention, in extracting the attribute information in step S4, the calculation unit 3 may extract attribute information about a closer node to the node determined in step S3. As described above, the adjacent node adjacent to the current node is the node having a hop count of one from the current node. The closer node to the current node is a node having a hop count not more than a predetermined value (e.g., 2) from the current node. Then, the calculation unit 3 may determine the feature value of the node determined in step S3, on the basis of the attribute information about the closer node.

Furthermore, the calculation unit 3 may display a screen in which the derived graph structure or network structure is schematically expressed. In addition, the calculation unit 3 may receive selection of the current node from a plurality of nodes displayed in the screen. For example, when the administrator clicks any of the displayed nodes with a mouse, the calculation unit 3 determines that the node is selected. Furthermore, in the screen in which the graph structure or network structure is schematically displayed, the calculation unit 3 may highlight an adjacent or closer node to the selected node. The calculation unit 3 preferably highlights the adjacent or closer node, for example in different color. This adjacent node or closer node is a node associated with the attribute information used for determining the feature value of the selected node.

Furthermore, when the calculation unit 3 receives the selection of the node, it may display a new window displaying a graph representing chronological change in feature value of the node (node selected as the current node by the administrator).

Figure 10:
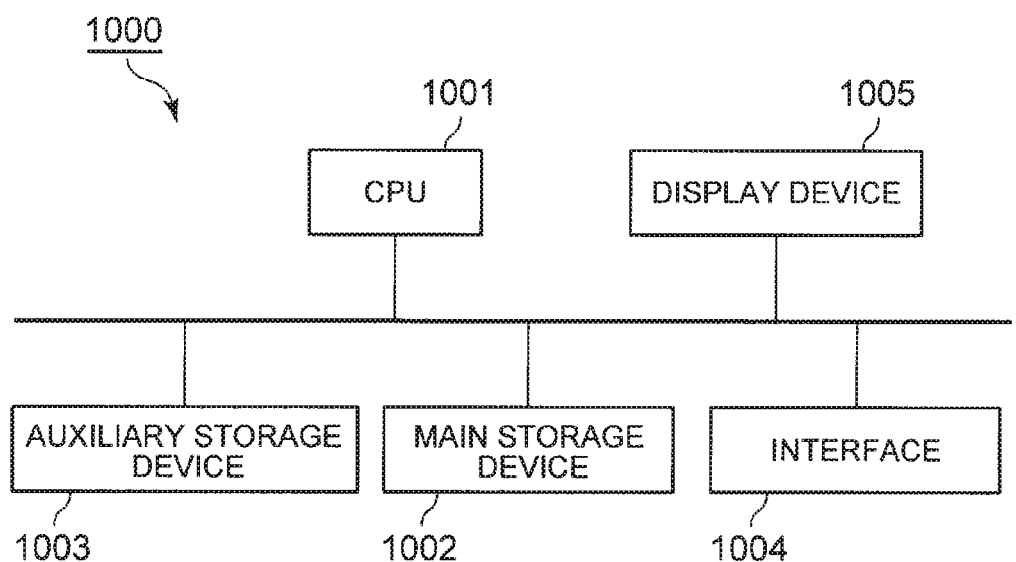
FIG. 10 It depicts a schematic block diagram illustrating an exemplary configuration of a computer according to an exemplary embodiment of the present invention.

FIG. 10 is a schematic block diagram illustrating an exemplary configuration of a computer according to an exemplary embodiment of the present invention. The computer 1000 includes a CPU 1001, a main storage device 1002, an auxiliary storage device 1003, an interface 1004, and a display device 1005.

The feature-value display system described above is mounted to the computer 1000. Operation of the feature-value display system is stored in the auxiliary storage device 1003 in a form of a program (feature-value display program). The CPU 1001 reads the program from the auxiliary storage device 1003, loads the program into the main storage device 1002, and performs the processing described above according to the program.

The auxiliary storage device 1003 is an example of a non-transitory tangible medium. Another example of the non-transitory tangible medium includes a magnetic disk, a magnetooptical disk, a CD-ROM, a DVD-ROM, a semiconductor memory or the like connected through the interface 1004. Furthermore, when this program is distributed to the computer 1000 through a communication line, the computer 1000 receiving the distributed program may load the program into the main storage device 1002 to perform the processing described above.

Furthermore, the program may partially achieve the processing described above. Furthermore, the program may be a difference program combined with another program already stored in the auxiliary storage device 1003 to achieve the processing described above.

Figure 11:
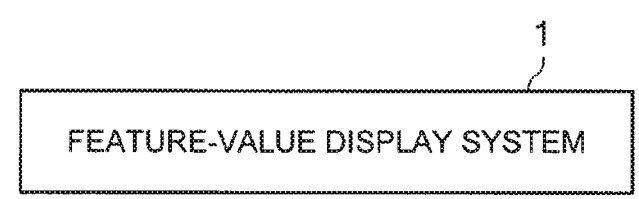
FIG. 11 It depicts a schematic view illustrating an outline of the present invention.

Next, summary of the present invention will be described. FIG. 11 is a schematic view illustrating an outline of the present invention. The feature-value display system 1 according to the present invention displays the feature value of the current node of the plurality of nodes constituting the graph structure or the network structure. The feature-value display system 1 displays the feature value of the current node, considering information generated on the basis of attribute information associated with the nodes adjacent to or closer to the current node, as the feature value of the current node itself.

As a result, the feature value of the node can be displayed so that the state of the node of the graph structure or the network structure can be accurately predicted.

Part or all of the exemplary embodiment described above can be also described as in the following supplementary notes, but are not limited to the following description.

(Supplementary note 1) A feature-value display system displaying a feature value of a current node of a plurality of nodes constituting a graph structure or a network structure, the feature-value display system displaying the feature value of the current node, considering information generated on the basis of attribute information associated with nodes adjacent to or closer to the current node, as the feature value of the current node itself.

(Supplementary note 2) The feature-value display system according to Supplementary note 1, in which the graph structure or the network structure includes a plurality of nodes, and edges connecting the nodes, each of the nodes corresponds to a communication device or a user of the communication device, the attribute information is information associated with the node, and information relating to the communication device or the user corresponding to the node, or information representing a use condition of the communication device of the user corresponding to the node, and each of the edge corresponds to previous communication between the nodes connected by the edge through the communication devices.

(Supplementary note 3) The feature-value display system according to Supplementary note 1 or 2, in which a screen schematically expressing the graph structure or the network structure is displayed, and selection of the current node from the plurality of nodes displayed in the screen is received.

(Supplementary note 4) The feature-value display system according to any of Supplementary notes 1 to 3, in which a feature value of a selected node is displayed, considering a statistic generated on the basis of attribute information associated with parties with which a user corresponding to the current node previously communicated, as the feature value of the current node itself.

(Supplementary note 5) The feature-value display system according to any of Supplementary notes 1 to 4, in which information about communication frequency between the nodes connected by the edge is associated with the edge, and when the feature value of the current node is generated, the communication frequency is taken into consideration.

(Supplementary note 6) The feature-value display system according to any of Supplementary notes 1 to 5, in which chronological change in feature value of the current node is displayed in a graph.

(Supplementary note 7) The feature-value display system according to Supplementary note 3, in which the node adjacent to or closer to the current node are highlighted in the screen, and the nodes are in the plurality of nodes in the screen schematically expressing the graph structure or the network structure, and the nodes are associated with the attribute information used for generating the feature value of the current node itself.

(Supplementary note 8) The feature-value display system according to Supplementary note 3 or 7, in which when selection of the current node is received, a new window is displayed, and the new window displays a graph representing chronological change in feature value of the current node.

(Supplementary note 9) A feature-value display method for, implemented by a computer, displaying a feature value of a current node of a plurality of nodes constituting a graph structure or a network structure, the method including displaying the feature value of the current node, considering information generated on the basis of attribute information associated with nodes adjacent to or closer to the current node in the graph structure or the network structure, as the feature value of the current node itself.

(Supplementary note 10) A feature-value display program causing a computer displaying a feature value of a current node of a plurality of nodes constituting the graph structure or the network structure to execute a process, including displaying the feature value of the current node, considering information generated on the basis of attribute information associated with nodes adjacent to or closer to the current node in the graph structure or the network structure, as the feature value of the current node itself.

(Supplementary note 11) A visualization system visualizing a characteristic of a current node of a plurality of nodes in association with each other, the visualization system including means for identifying a related nodes relating to the current node on the basis of association between the nodes, and means for outputting a graph representing the characteristic of the current node on the basis of attribute information about the related nodes.

As described above, the present invention has been described with reference to the exemplary embodiments, but it should be understood that the present invention is not limited to the exemplary embodiments described above. Various changes and modifications which can be understood by a person skilled in the art may be made to the configurations and details of the present invention within the scope of the present invention.

The present application is based on and claims the benefit of priority from U.S. Provisional Application No. 62/018,891 filed on Jun. 30, 2014, the disclosure of which is incorporated herein in its entirety by reference.

INDUSTRIAL APPLICABILITY

The present invention can be preferably used for prediction of a state of a node in a graph structure or a network structure.

REFERENCE SIGNS LIST

1 Feature-value display system
2 Input unit
3 Calculation unit
4 Display unit

The invention claimed is:

1. A feature-value display system displaying a feature value of a current node of a plurality of nodes constituting a graph structure or a network structure, the feature-value display system comprises a memory storing instructions and a processor configured to execute the instructions to:
display the feature value of the current node, considering information generated on the basis of attribute information associated with nodes adjacent to or closer to the current node, as the feature value of the current node itself;
display a screen schematically expressing the graph structure or the network structure;
receive selection of the current node from the plurality of nodes displayed in the screen; and
display, when the selection of the current node is received, a new window, the new window displaying a graph representing chronological change in feature value of the current node.

2. The feature-value display system according to claim 1, wherein
the graph structure or the network structure includes a plurality of nodes, and edges connecting the nodes,
each of the nodes corresponds to a communication device or a user of the communication device,
the attribute information is information associated with the node, and information relating to the communication device or the user corresponding to the node, or information representing a use condition of the communication device of the user corresponding to the node, and
each of the edge corresponds to previous communication between the nodes connected by the edge through the communication devices.

3. The feature-value display system according to claim 1, wherein the processor is further configured to execute the instructions to:
display a feature value of a selected node, considering a statistic generated on the basis of attribute information associated with parties with which a user corresponding to the current node previously communicated, as the feature value of the current node itself.

4. The feature-value display system according to claim 1, wherein the processor is further configured to execute the instructions to:
associate information about communication frequency between the nodes connected by an edge with the edge; and
generate the feature value of the current node based on the communication frequency.

5. The feature-value display system according to claim 1, wherein the processor is further configured to execute the instructions to:
display chronological change in feature value of the current node in a graph.

6. The feature-value display system according to claim 1, wherein
the nodes adjacent to or closer to the current node are highlighted in the screen, and the nodes are in the plurality of nodes in the screen schematically expressing the graph structure or the network structure, and the nodes are associated with the attribute information used for generating the feature value of the current node itself.

7. A visualization system visualizing a characteristic of a current node of a plurality of nodes in association with each other, the visualization system comprising:
a first unit, implemented by a processor, configured to identify related nodes relating to the current node on the basis of association between the nodes, and
a second unit, implemented by the processor and a display device, configured to:
output a graph representing the characteristic of the current node on the basis of attribute information about the related nodes; and
display a screen schematically expressing the graph structure or the network structure, and
the first unit is further configured to:
receive selection of the current node from the plurality of nodes displayed in the screen; and
consider information generated on the basis of attribute information associated with nodes adjacent to or closer to the current node, as the feature value of the current node itself, and
the second unit is further configured to, when the first unit receives selection of the current node, display a new window, the new window displaying a graph representing chronological change in feature value of the current node.

8. A feature-value display method for, implemented by a computer, displaying a feature value of a current node of a plurality of nodes constituting a graph structure or a network structure, the method comprising:
displaying the feature value of the current node, considering information generated on the basis of attribute information associated with nodes adjacent to or closer to the current node in the graph structure or the network structure, as a feature value of the current node itself;
displaying a screen schematically expressing the graph structure or the network structure;
receiving selection of the current node from the plurality of nodes displayed in the screen; and
when selection of the current node is received, displaying a new window, the new window displaying a graph representing chronological change in feature value of the current node.

9. A non-transitory computer readable recording medium in which a feature-value display program is recorded, the program causing a computer displaying a feature value of a current node of a plurality of nodes constituting the graph structure or the network structure to execute a method, the method comprising:
- displaying the feature value of the current node, considering information generated on the basis of attribute information associated with nodes adjacent to or closer to the current node in the graph structure or the network structure, as the feature value of the current node itself;
- displaying a screen schematically expressing the graph structure or the network structure;
- receiving selection of the current node from the plurality of nodes displayed in the screen; and
- when selection of the current node is received, displaying a new window, the new window displaying a graph representing chronological change in feature value of the current node.

* * * * *